United States Patent [19]
Kornrumpf et al.

[11] 3,832,621
[45] Aug. 27, 1974

[54] RELIABLE STATIC POWER CONVERTER WITH CONTROL LOGIC

[75] Inventors: William P. Kornrumpf; John D. Harnden, Jr., both of Schenectady, N.Y.

[73] Assignee: General Electric Company, Schenectady, N.Y.

[22] Filed: Apr. 2, 1973

[21] Appl. No.: 346,982

Related U.S. Application Data

[62] Division of Ser. No. 211,926, Dec. 27, 1971.

[52] U.S. Cl............... 321/11, 321/18, 321/43, 219/10.77
[51] Int. Cl............................................. H02m 1/18
[58] Field of Search............... 321/45 R, 18, 11, 43

[56] References Cited
UNITED STATES PATENTS

| | | | |
|---|---|---|---|
| 3,350,628 | 10/1967 | Gallaher et al. | 321/16 X |
| 3,504,265 | 3/1970 | Toulemonde | 321/16 X |
| 3,601,680 | 8/1971 | Beckwith | 321/18 X |
| 3,654,541 | 4/1972 | Kelly, Jr. et al. | 321/27 X |
| 3,697,853 | 10/1972 | Nowell et al. | 321/11 |
| 3,747,000 | 7/1973 | McIver | 321/43 X |

*Primary Examiner*—William M. Shoop, Jr.
*Attorney, Agent, or Firm*—Donald R. Campbell; Joseph T. Cohen; Jerome C. Squillaro

[57] ABSTRACT

The control circuit for an inverter is suitable for fabrication as an integrated circuit and includes, in addition to turn-on circuitry, protection circuits to assure reliable and automatic operation under abnormal circuit conditions such as overvoltages and low input voltages tending to cause device and power circuit failures. Voltage responsive sensors such as Zener diodes sense the appropriate voltages at selected points on the power circuit and modify the operation of the control circuit, preferably by over-riding and inhibiting the turn-on circuitry. Disclosed with regard to a one-thyristor, variable frequency series resonant inverter with an added maximum frequency control, the protection circuit technique is applicable to inverters generally.

9 Claims, 9 Drawing Figures

RELIABLE STATIC POWER CONVERTER WITH CONTROL LOGIC

This is a division of application Ser. No. 211,926, filed Dec. 27, 1971.

BACKGROUND OF THE INVENTION

This invention relates to solid state cooking appliances based on induction heating, and more particularly to improved control circuits for achieving reliable and convenient operation of these appliances so as to be suitable for mass usage. The invention further relates to protective control logic for inverters and stage power converters generally.

The application of induction heating to the cooking of food has been known generally for a number of years. The basic mechanism is that the alternating magnetic field produced by an induction heating coil is coupled across a gap and the utensil support with the utensil bottom, which acts as a single turn secondary winding. Theoretically the process is efficient since heat is generated only in the metallic utensil where it is wanted, and none is lost to the surrounding atmosphere. Nevertheless, previous equipment for induction cooking in general was bulky and expensive and not potentially competitive with the common gas range and conventional electrical range based on resistance heating.

Solid state induction cooking appliances operating at ultrasonic frequencies of 18 kHz and above make possible a significant reduction in cost and size and overcome other deficiencies of the prior art equipment. An economical appliance with simplified power circuits is described in copending allowed application Ser. No. 200,424, filed Nov. 19, 1971 by the present inventors, and assigned to the same assignee as this invention. This appliance is suitable for an induction surface unit in an electric range or a portable counter-top warming or cooking appliance. Basically it comprises a flat spiral air-core or ferromagnetic-core induction heating coil mounted beneath a smooth, unbroken non-metallic cooktop surface. A static power conversion circuit typically formed by a rectifier and an inverter generates an ultranonic frequency wave for driving the induction heating coil. The simplified inverter power circuit uses only one thyristor or transistor and therefore only one firing or base drive circuit, and uses the induction heating coil in a dual function as the inductance in a series or parallel resonant circuit as well as to couple power to the utensil.

Another essential feature of a successful induction cooking appliance, in addition to inexpensive power circuits, is that it be reliable, safe, and convenient for use by the ordinary technically unskilled person such as a chef or housewife. Inverters require protection to prevent malfunctioning and failure due to abnormal circuit conditions including overcurrents and overvoltages, and this protection is especially needed for semiconductor components. The problem is compounded by the fact that the utensil losses are the inverter load and that the reflected inductance of the utensil changes the inverter's electrical parameters. There are severe load requirements if the unit is to be operable with a variety of ordinary pots and pans of different sizes and materials, under load and no-load conditions with the utensil on the unit or removed from it, and with containers the unit was not designed to heat since this is beyond the control of the manufacturer. The user will not be content to replace fuses, reset circuit breakers or even restart the unit in the event of conditions arising which have not been anticipated in the circuit design. Furthermore, it is not desirable to implement these functions by the addition of components to the power circuit itself according to the prior art teachings since these components conduct power currents and add disproportionately to the cost. Automatic and safe operation by the consumer calls for new approaches to these essential circuit functions.

SUMMARY OF THE INVENTION

The solid state cooking appliance to which the invention is applicable comprises an induction heating coil that is mounted adjacent to a substantially unbroken non-metallic utensil support and produces an alternating magnetic field for coupling power to a cooking utensil. A static power conversion circuit typically comprising a full wave rectifier and a solid state inverter power circuit generates an ultrasonic frequency wave for driving the induction heating coil. A control circuit for the power converter operates at signal level and is designed to be manufacturable as a hybrid or monolithic integrated circuit. The control circuit conventionally includes a turn-on circuit for selecting the intervals of conduction of the solid state power device or devices controlling the operation of the power circuit. The innovation is made that the control circuit also incorporates features such as protection circuits and an optional utensil presence detection circuit to obtain reliable and automatic operation of the cooking appliance under a variety of load and no-load conditions and under abnormal power circuit conditions such as overvoltages and low input voltage that would if uncorrected tend to cause malfunction or failure of the power device or other components of the power circuit. This is accomplished preferably by over-riding the normal operation of the turn-on circuit. The absence of a cooking utensil and the existence of abnormal power circuit conditions are sensed preferably by means of voltage responsive sensors such as Zener diodes connected between appropriate points on the power circuit and the signal level control circuit. In this way the power circuit remains simple since the required sensors and protective circuits do not conduct power currents. Furthermore, the utensil presence detection circuit does not require physical contact with the cooking utensil and is compatible with the important unbroken utensil support feature of the cooking appliance.

The invention is described by way of illustration with regard to power circuit in the form of a variable frequency series resonant inverter employing a thyristor and inverse-parallel diode as the solid state power devices. Adjusting the inverter output frequency between about 18-40 kHz varies the power coupled to the cooking utensil and therefore the cooking temperature. Only one firing control circuit is required, and comprises a variable repetition rate voltage controlled pulse generator controlled by the voltage level on a control capacitor. A maximum frequency control can be provided if desired and is operative to limit the repetition rate of the firing pulse generator. This and the other protection circuits ensure sufficient commutating energy and turn-off time for the thyristor, and also control transients during start-up and shut-down and under low input voltage conditions. The protection circuits reduce the firing pulse repetition rate by clamping or discharging the control capacitor, and also by inhibiting the pulse generator. An overvoltage detection circuit senses the voltage at a terminal of the thyristor and is operative when the voltage rises above a predetermined maximum. A low input voltage detection circuit is operative in response to the sensing of a low voltage at the rectifier terminals, and includes an inhibit circuit for completely stopping the production of firing pulses after a predetermined time delay. The circuit also operates during start-up and shut-down when power is supplied to and removed from the circuit.

These protective circuit features are useful with inverter circuits in general and are not limited to power converters for solid state cooking appliances. Another control circuit feature specifically needed for cooking appliances, however, is the utensil presence detection circuit for sensing a selected power circuit parameter indicative of the absence of a cooking utensil coupled with the induction heating coil and modifying the operation of the control circuit. In the series resonant inverter previously mentioned, the reapplied forward voltage at the thyristor terminal is characteristically initially higher in the unloaded case than in the loaded case. The sensing of the absence of the cooking utensil results in the lowering of the pulse generator repetition rate to the audio level so that the user is aware the unit is turned on.

DESCRIPTION OF THE PREFERRED EMBODIMENT

Figure 1:
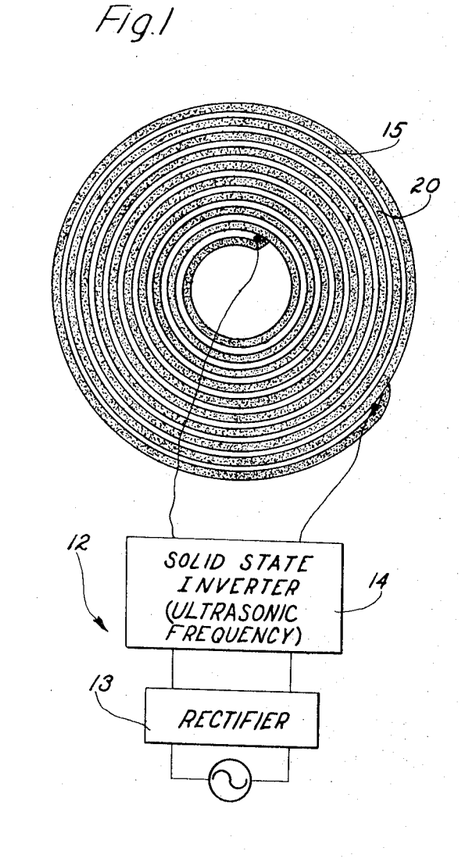
FIG. 1 is a block diagram of a solid state converter for supplying ultrasonic frequency power to a flat spiral induction heating coil, shown in plan view, in an induction cooking appliance constructed in accordance with the invention.
Figure 2:
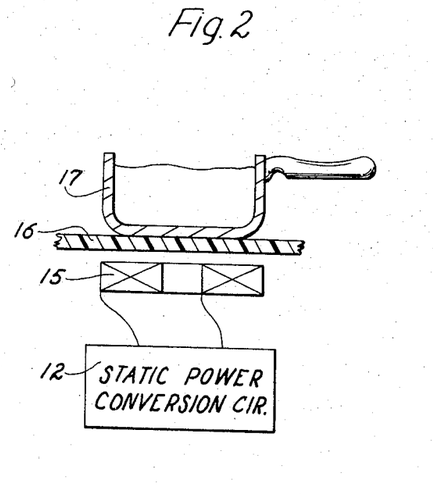
FIG. 2 is a diagrammatic cross-sectional view showing the relation of the induction heating coil to the utensil support and cooking utensil.
Figure 3:
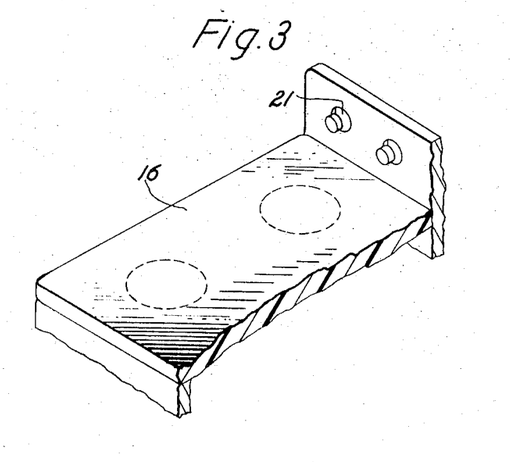
FIG. 3 is a fragmentary perspective view of an electric range with a smooth utensil supporting top surface.

The induction cooking appliance shown in FIGS. 1–3 will be described with regard to an induction surface unit in an electric range, but essentially the same mechanical structure and circuitry in a lower power version is also suitable for a portable counter-top food cooking or warming appliance. The static power conversion circuit indicated generally at 12 is prefarably energized by a single phase commercially available 60 Hz, 120 volt or 240 volt source of alternating current potential, but in appropriate cases this equipment can be designed for use with other low frequency, low voltage or d-c sources. Static power converter 12 comprises generally a rectifier 13 and a solid state inverter 14 for converting the unidirectional rectifier output to an ultrasonic frequency wave for driving an induction heating coil 15. Induction heating coil 15 in a single layer, annular, flat spiral, air-core coil wound with solid flat strip conductors or braided ribbon conductors with a rectangular cross section. To generate sufficient magnetic flux to heat the utensil to the desired cooking temperature, coil 15 is tightly wound with the short cross-sectional dimension of the conductors facing upwards and adjacent turns separated by a flat insulating strip 20.

In the cooking appliance (FIG. 2), induction heating coil 15 is appropriately mounted in a horizontal position immediately below a non-metallic support 16 typically made of a thin sheet of glass or plastic. Support plate 16 is essentially non-conducting but may have some metallic content for decorative or shielding purposes, and in the same manner coil 15 is nominally flat and may be somewhat shaped or configured for several reasons. Support plate 26 is referred to as the cooking surface and supports the metallic cooking utensil 17 to be heated. Cooking utensil 17 is more particularly an ordinary cooking pot or pan, a frying pan, or some other available metallic utensil used in food preparation. The utensil can be made of a magnetic material such as magnetic stainless steel, enameled steel, or cast iron; a non-magnetic material such as alminum; or a laminated product such as copper-clad stainless steel or triple-clad (stainless steel-cast iron-stainless steel). Special cooking utensils are not required, although the best and most efficient results are obtained by otpimizing the size, shape, and material of the cooking utensil. Magnetic steel utensils couple well to coil 15 and are heated most efficiently, while some copper-clad utensils and thick aluminum utensils do not couple well to the coil, and the laminated and cast iron utensils are inbetween. Any of these may be used, however, in an induction cooking appliance when the coil 15, static power conversion circuit 12, and the gap between the coil and utensil are properly designed. Ordinarily a gap of at least one-eighth inch is required between the top of coil 15 and the bottom of utensil 17 to allow space for support 16, and the gap is no greater than about one-half inch at full power in order to couple sufficient power into the utensil bottom to produce adequate heating for cooking purposes. Although an air-core coil 15 is illustrated, ferromagnetic-core coils can be used also.

Operation of solid state inverter 14 to impress an ultrasonic frequency wave on induction heating coil 15 results in the generation of an alternating magnetic field. The magnetic flux is coupled across the air gap through non-metallic support 16 to utensil 17. An ultrasonic frequency above 18 kHz or so is generally considered to be the threshold of human hearing and is selected to make the cooking appliance inaudible to most people. An essential feature of the invention is the non-metallic support 16 which, as shown in FIG. 3, preferably has a relatively smooth and substantially unbroken utensil supporting surface. At ultrasonic frequencies there are insignificant reaction forces which at lower frequencies would cause utensil 17 to move horizontally when placed on the cooktop surface approximately centered with respect to one of the induction surface unit positions illustrated in dotted lines. FIG. 3 shows an induction cooking appliance in the form of an electric range, with a control knob 21 for each unit on the upstanding control panel for turning the individual unit on and off and setting the desired heating level or utensil temperature.

The transfer of energy to utensil 17 to heat it is relatively efficient since heat is generated only in the utensil and none is lost because of mismatch in size between coil and utensil. Another feature of induction cooking is that the surface of support plate 16 is relatively cool since the highest temperatures involved are about 450°F, the approximate maximum temperature to which the bottom of utensil 17 is heated to cook food. Because of the cool cooking surface, spilled foods do not burn and char and hence both support plate 16 and utensil 17 are easy to clean. The cod, smooth support also makes it possible to use the surface before cooking, or even immediately after cooking, for other functions related to food preparation such as opening cans, trimming and cutting vegetables, transferring cooked foods from the cooking utensil to a serving dish, etc. Moreover, the inductive heating of cooking utensils is relatively uniform and results in a low thermal mass system. Since there is a relatively low storage of heat in utensil 17, the heating level or temperature to which the utensil is heated can be changed rapidly, as from boiling to simmering to warming temperatures.

Figures 4, 5:
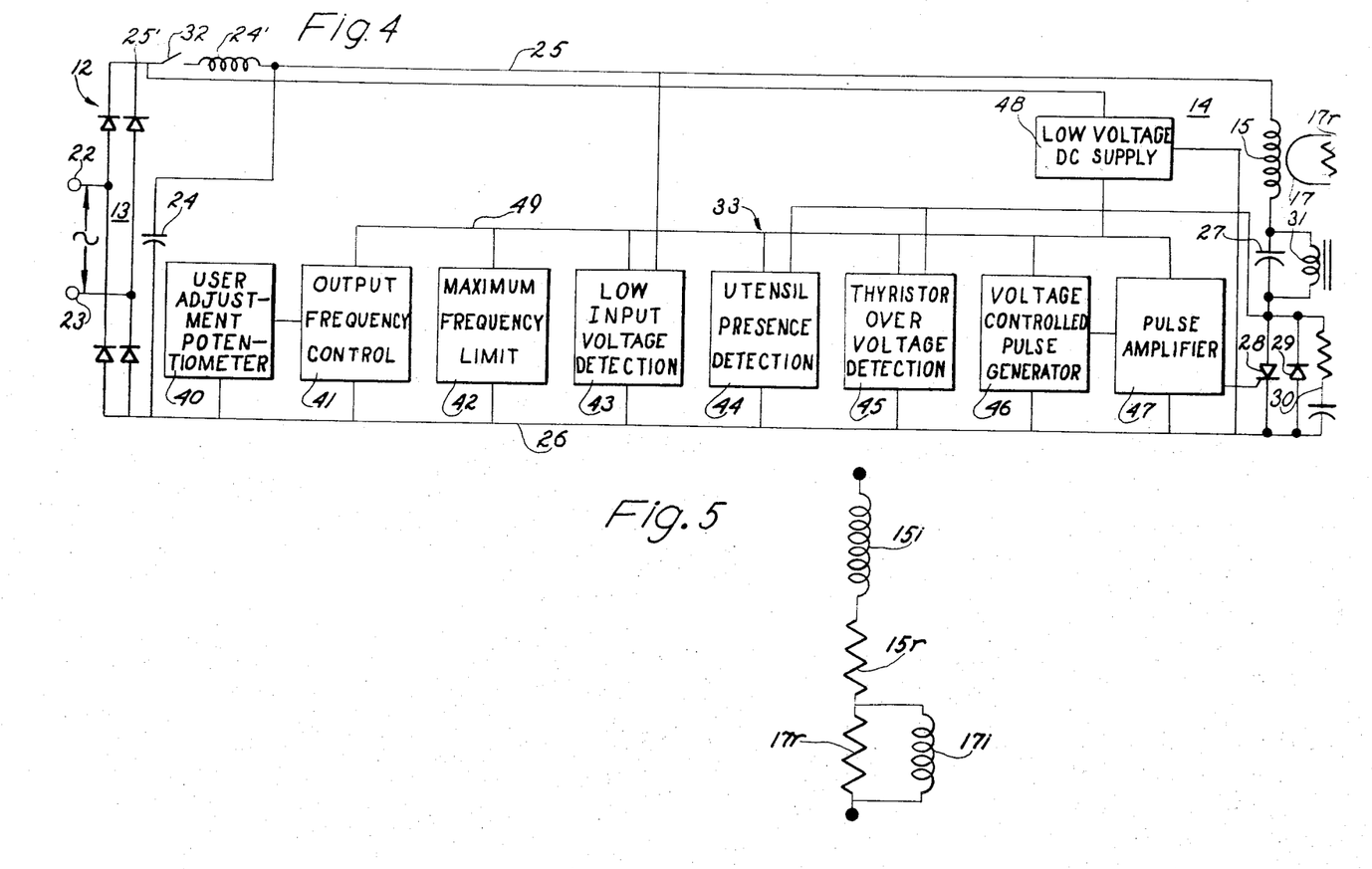
FIG. 4 is a schematic circuit diagram of a static power conversion circuit comprising a rectifier and a one-thyristor series resonant inverter, showing in block diagram form a control circuit that provides adjustment of the cooking temperature and incorporates automatic operation and protection features.
FIG. 5 is a simplified equivalent electrical circuit diagram of the induction heating coil and cooking utensil load.

The particular form of power converter circuit 12 illustrated by way of example in FIG. 4 is characterized by a relatively simple and inexpensive inverter that uses only one thyristor and control circuit, and employs induction heating coil 15 in a dual function for coupling power to the utensil (load) and providing commutating inductance in the thyristor commutation circuit. In the preferred embodiment to be discussed, power converter input terminals 22 and 23 are energized by a 120 volt, 60 Hz source of a-c supply voltage. Rectifier 13 is a conventional full wave diode bridge rectifier, but can be replaced by a phase controlled bridge rectifier when it is desired to control the power output of the ultrasonic frequency generator, and therefore the heating level or temperature to which the utensil is heated, by varying the d-c supply voltage. The full wave rectified output of bridge rectifier 13 is not applied to the filter network comprised by a series filter inductor 24' and shunt filter capacitor 24 until after the closure of an on-off switch 32. As will be explained later, power is applied to firing control circuit 33 before energizing inverter circuit 14. Inverter 14 is a one-thyristor series capacitor commutated or series resonant inverter that generates opposite polarity damped sinusoidal pulses. The power circuit comprises essentially induction heating coil 15 connected in series circuit relationship with a commutating capacitor 27 and a unidirectional conducting thyristor 28 between d-c supply terminals 25 and 26. A diode 29 to conduct power current in the reverse direction is connected across the load terminals of thyristor 28. A series RC snubber circuit 30 is also connected across the load terminals of thyristor 28 for $dv/dt$ protection to limit the rate of rise of reapplied forward voltage to the device. The power circuit also includes a reset inductor 31 connected directly across commutating capacitor 27. The function of reset inductor 31 is to reset commutating capacitor 27 between cycles of operation when both thyristor 28 and diode 29 are non-conductive. Thyristor 28 is also known as a silicon controlled rectifier, and although other controlled solid state power devices can be substituted, the combination of the inverse-parallel connected silicon controlled rectifier and diode are clearly preferred in this low cost circuit. Only one gating circuit is required since diode 29 becomes forward biased and conducts when the current in the series resonant circuit reverses in the negative polarity half cycle.

More accurately speaking the inverter load is the loss in the utensil. Induction heating coil 15 functions as the primary winding of an air-core transformer, while utensil 17 functions as a single-turn secondary winding with a series resistance 17r representing the resistive part of the $I^2R$ or eddy current losses, and hysteresis losses where applicable. The currents and voltages induced in utensil 17 when the induction surface unit is in operation are determined essentially by the transformer laws. The physical equivalent for utensil 17 in the form of a single turn winding and resistive losses 17r is given in FIG. 4. FIG. 5 shows a simplified equivalent electrical circuit for coil 15 and utensil 17. Coil 15 is represented by a series connected inductance 15i and resistance 15r and these are in turn in series with the parallel combination of an inductance 17i and resistance 17r representing the utensil. This electrical equivalent circuit is based on conventional transformer equivalent circuit analysis, and has been found to reasonably agree with experimental results.

With the utensil load in place, the commutating inductance for the series resonant circuit comprising coil 15 and commutating capacitor 27 is composed of both the coil inductance 15i and the reflected utensil inductance 17i. Under no-load conditions, with the utensil removed from the induction surface unit, the amount of commutating inductance increases. This causes a change in the resonant frequency of the series resonant circuit, and there is a decrease in the inverter output frequency. With an average or selected utensil load in place, this series resonant circuit is tuned to resonance at a resonant frequency higher than the highest desired output frequency. The ultrasonic output frequency range of interest is between approximately 18 kHz and 40 kHz. The upper limit of this frequency range is determined largely by economic considerations, in conjunction with the high frequency limitations of available thyristor devices.

Figure 6A:
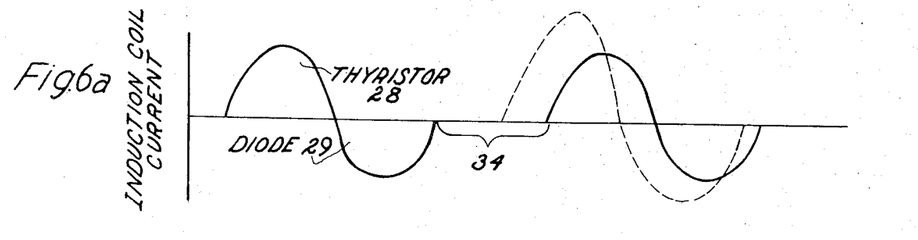
FIGS. 6a and 6b are waveform diagrams of the induction coil current and commutating capacitor voltage for the converter of FIG. 4, showing in each diagram the waveforms at two different inverter output frequencies.
Figure 6B:
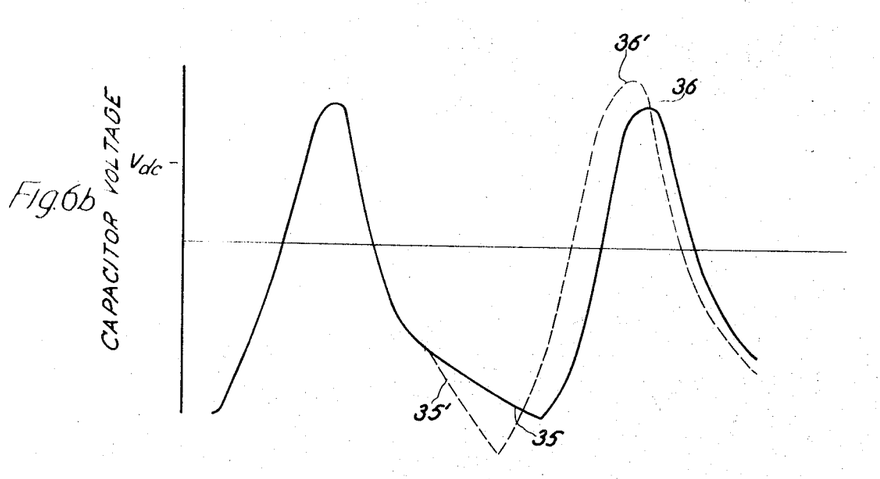

The operation of the power circuit portion of inverter 14 will be reviewed briefly before explaining the structure and operation of firing control circuit 33. It is assumed that firing or gating control circuit 33 supplies firing signals at a variable repetition rate to the gate thyristor 28, to operate the inverter with a corresponding repetition rate or output frequency according to the heating level or specific utensil temperature that is desired. Further details on the operation of the power circuit are given in the aforementioned Harnden and Kornrumpf application, Ser. No. 200,424. As was previously mentioned, the unit is turned on and off and the power level is set by means of knob 21 on the range control panel (FIG. 3). In steady state operation of the inverter, it is assumed that commutating capacitor 27 is reset negatively subsequent to the previous complete conduction cycle by reset inductor 31. The application of a firing pulse to thyristor 28 causes it to turn on, energizing the damped series R-L-C oscillatory circuit comprising coil 15, commutating capacitor 27, and the reflected inductance and losses in utensil 17. A positive polarity half sinusoidal current pulse flows through induction heating coil 15 and charges commutating capacitor 27 to a value exceeding the supply voltage $V_{dc}$. At the end of the half cycle, the current drops to zero and then reverses as commutating capacitor 27 discharges negatively through diode 29. Commutating capacitor 27 applies a reverse bias to thyristor 28 at the end of the positive half cycle as the current drops to zero, and turn-off is assured by the reverse voltage applied to the thyristor by conducting diode 29. Referring also to FIG. 6a, the current through induction heating coil 15 at the end of the negative polarity half cycle remains at zero since the next gating pulse is not applied to thyristor 28 at this time. While power devices 28 and 29 were conducting, the current in reset inductor 31 was increasing due to the net positive d-c voltage on commutating capacitor 27 during the conduction cycle. During the power circuit off-time reset inductor 31 discharges, thereby leaving commutating capacitor 27 negatively charged at the end of the circuit off-time. The supplying of a gate pulse to thyristor 28 begins the next complete cycle of operation FIG. 6a shows in full lines the sinusoidal induction coil current for two complete cycles of operation separated by a time delay interval 34 corresponding to the circuit off-time. The corresponding commutating capacitor voltage under steady-state conditions with the utensil load in place is shown in full lines in FIG. 6b. At the end of the conduction cycle capacitor 27 has a negative voltage lower than the peak positive voltage, and the action of reset inductor 31 during the time delay interval 34 is to change the capacitor voltage almost linearly as indicated at 35, leaving the capacitor more negatively charged at the end of time delay interval 34. Due to this extra charge on commutating capacitor 27, the peak capacitor voltage 36 during the next cycle of operation is higher, as compared to a power circuit without reset inductor 31, since the system energy is replenished. The effect of shortening time delay interval 34 by increasing the repetition rate of the gating pulses is to increase the inverter repetition rate or output frequency and therefore the current and power supplied to utensil 17. Increasing the inverter output frequency also has the beneficial result of increasing the amplitude of the sinusoidal current pulses as well as their frequency. This is illustrated in Fig. 6a by the second cycle dashed line current waveform. By advancing the thyristor gating pulse, the ratio of conduction time to capacitor recharge time decreases, thereby on a steady-state basis increasing the average current in reset inductor 31. The result is that, referring to the dashed line capacitor voltage characteristic in FIG. 6b, commutating capacitor 27 is charged negatively to a higher negative voltage during the circuit off-time as indicated at 35′ so that the peak capacitor voltage 36′ during the next conduction cycle is higher than the peak voltage 36 for the lower inverter frequency case. A limit on inverter frequency is reached when the value of the current in reset inductor 31 becomes significant in comparison to the high frequency reverse current pulse in coil 15 and commutating capacitor 27, since this in effect reduces the commutation time available to the thyristor. In summary, there are two effects that increase the power in watts supplied to utensil 17 when the inverter output frequency is increased. There are larger and more frequently applied current pulses in induction heating coil 15. In addition, watts control can be obtained by varying the input d-c voltage by using a phase controlled rectifier 13 as previously mentioned. Furthermore, the mechanical technique of raising and lowering the induction heating coil 15 relative to the utensil to thereby change the gap spacing can also be used. This is further explained in Harnden and Kornrumpf application Ser. No. 200,424.

The function of control circuit 33 is not only to generate the train of variable repetition rate firing pulses for thyristor 28, but also to incorporate control logic which ensures reliable, automatic, and satisfactory operation of the induction cooking appliance. This is done in this control circuit by modifying the normal operation of the control circuit, specifically the turn-on circuitry for producing the firing signals that initiate turn-on of thyristor 28. The firing pulse repetition rate is changed to a lower more satisfactory value, or the generation of firing pulses is inhibited completely when certain predetermined abnormal circuit conditions are sensed that tend to lead to malfunction or failure of the power device or other power circuit components. In addition to these protective circuit features, the control circuit is used during start-up and shut-down of the unit, and to adapt the unit for operation in the no-load condition by sensing the absence of a utensil coupled to the induction heating coil and modifying the operation of the control circuit. The user adjustment potentiometer 40 and output frequency control 41 determine the basic input voltage level to a voltage controlled pulse generator 46. The firing pulses produced by voltage controlled pulse generator 46 are amplified by pulse amplifier 47 and applied to the gatecathode of thyristor 28. These functional units comprise the turn-on or firing signal circuit for producing firing pulses at a selected repetition rate to thereby establish a basic inverter output frequency corresponding to the heating level or utensil temperature that is desired. Low voltage d-c power supply 48 is connected between power rectifier terminals 25′ and 26, and establishes a signal level positive low voltage d-c supply terminal 49 and the common negative supply terminal 26 between which the various functional units 40–47 of the control circuit are connected.

Maximum frequency limit control circuit 42 is a protective circuit feature that prevents the inverter from entering an unstable short commutation time mode of operation for the reasons given in the discussion of FIG. 6a. Low input voltage detection circuit 43 has an input from positive d-c supply terminal 25 and is a protective circuit feature that is operative upon the reduction of the input voltage to initially reduce the repetition rate of the firing pulse generator 46 and, after a predetermined time delay, to lock-out or inhibit pulse generator 46. When the input voltage is too low to yield sufficient commutation energy in commutating capacitor 27, as during a brown-out, there may be a commutation failure. This circuit is also operative during start-up before filter capacitor 24 is fully charged, and is effective to control starting transients caused by the interaction of the series resonant power circuit and the parallel resonant circuit formed by reset inductor 31 and capacitor 27. During shut-down this circuit operates to remove power from the power circuit in a controlled manner since the pulse generator continues to operate during the time delay interval. Utensil presence detection circuit 44 lowers the repetition rate of the firing pulses developed by voltage controlled pulse generator 46 to an audible level when the induction surface unit has no load, that is, when the unit is turned on before the utensil is in cooking position or when the utensil is removed before turning off the unit. This is one way to annunciate an operating unit to the user. The circuit is rendered operative by the sensing of a power circuit parameter indicative of the absence of a coupled utensil, in particular the high initial reapplied forward voltage at the anode of thyristor 28. The thyristor overvoltage detection circuit 45 is a protection circuit feature that monitors the thyristor forward blocking voltage and adjusts the repetition rate of voltage controlled pulse generator 46 to keep the thyristor in a safe operating mode. Due to the fact that the amplitude of the sinusoidal current pulses in induction heating coil 15 and the commutating capacitor voltage increases with an increase in the inverter output frequency, this circuit lowers the output frequency when the forward blocking voltage exceeds a predetermined critical value lower than the peak forward voltage rating of the thyristor. This reduces the forward blocking voltage applied to the thyristor. Thyristor over-voltage detection circuit 45 accordingly has an input from the anode thyristor 28. It will be recalled that $dv/dt$ protection for the thyristor is obtained by use of series RC circuit 30.

An ultrasonic frequency static power converter provided with a firing control circuit 33 with these features operates from no load to full load with a high degree of reliability. Firing control circuit 33 is preferably fabricated as a monolithic or hybrid integrated circuit. In order to avoid the addition of power consuming components to the inverter power circuit, the trade off is made between retaining a simple power circuit and increasing the complexity of the control circuit. Hence the desirability of manufacturing it in integrated circuit form. Another feature of the control circuit is that the detection of the absence of the utensil by sensing a power circuit voltage or other power circuit parameter in the manner to be explained is in keeping with the principle a substantially unbroken utensil support 16. Although this could be done by a mechanical probe projecting through support plate 16 and extending above the utensil supporting surface, this is not compatible with a smooth top appliance. It is also desirable to fabricate the thyristor-diode combination 28, 29 and power rectifier 13 as hybrid or monolithic integrated circuits. These low cost approaches are needed especially in consumer-oriented appliances to reduce the cost as well as to save space.

Figure 7:
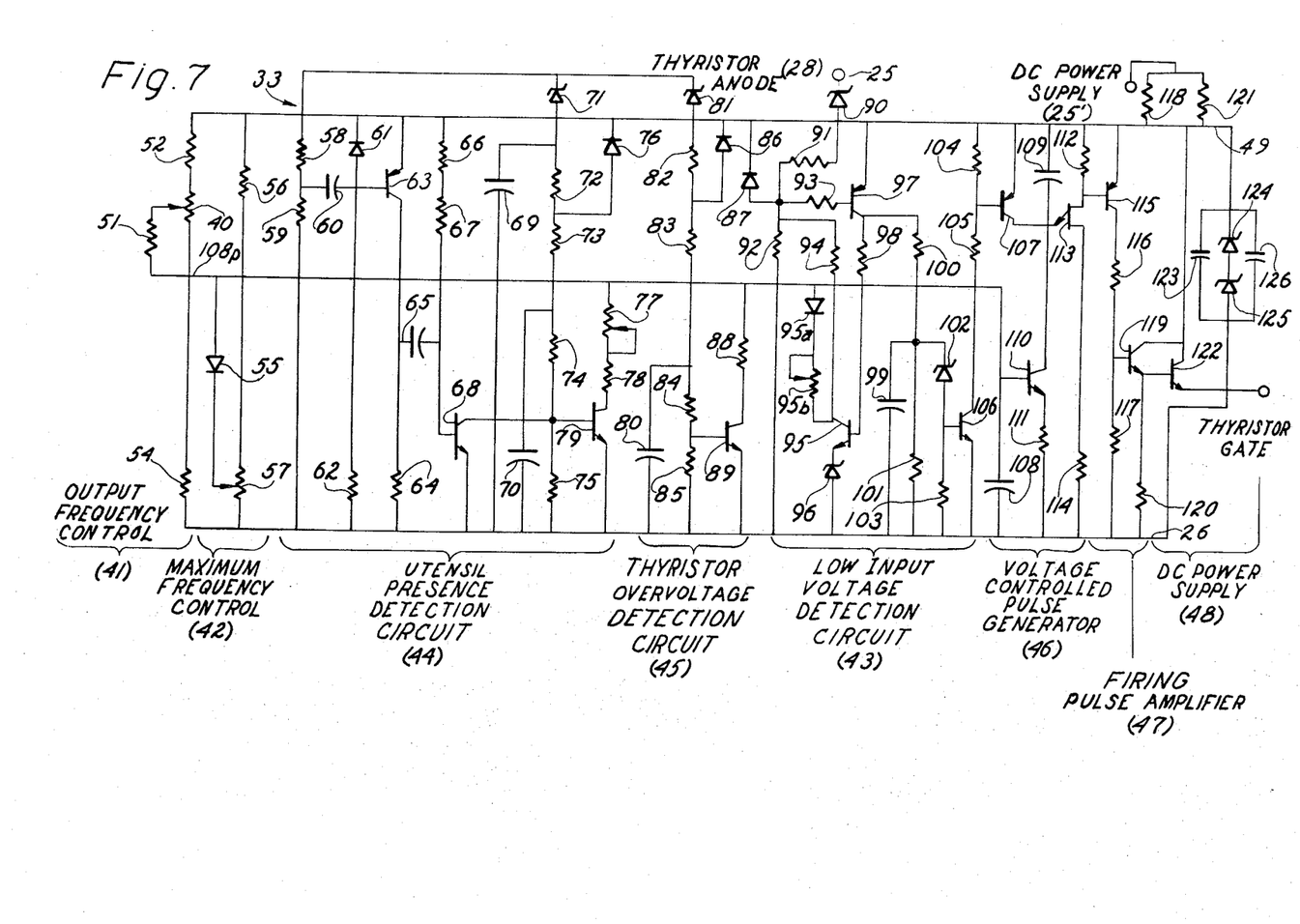
FIG. 7 is a detailed schematic circuit diagram of the firing control circuit illustrated in block diagram form in FIG. 4.

The components illustrated in the detailed circuit diagram of firing control circuit 33 shown in FIG. 7 are numbered consecutively from left to right for the convenience of the reader. The approach to the design of this circuit is compatible with monolithic integrated circuit techniques. The low voltage d-c power supply 48 comprises a pair of voltage dropping resistors 118 and 121 connected in parallel between the high and low voltage positive d-c terminals 25' and 49. A pair of series Zener diodes 124 and 125 provide a Zener regulated low voltage supply between terminals 49 and 26. Typically the control circuit is supplied with 15 volts d-c between terminals 49 and 26. The full wave rectified 60 Hz voltage appearing at the power rectifier terminals 25' and 26 is filtered by a pair of capacitors 123 and 126, each connected between low voltage terminals 49 and 26. Filter capacitor 123 is an energy storage electrolytic capacitor while filter capacitor 126 is a high frequency ceramic capacitor to provide a low source impedance so that there is sufficient current to generate a firing pulse of the required magnitude.

Voltage controlled pulse generator 46 comprises essentially a complementary unijunction transistor relaxation oscillator. The circuit includes a timing capacitor 109 connected in series with the collector-emitter path of an n-p-n control transistor 110 and an emitter resistor 111 between terminals 49 and 26. The base terminals of CUJT 113 are respectively connected in series with base resistors 112 and 114 between terminals 49 and 26, the emitter of the active device being connected to the negative plate of capacitor 109. The complementary unijunction transistor is similar to the ordinary unijunction transistor but operates in the third quadrant rather than in the first quadrant. The device is further described in application note No. 90.72, dated February 1968, which is available from the Semiconductor Products Department, General Electric Company, Syracuse, N.Y. Used in an oscillator the device has excellent frequency stability. Transistor 110 functions as a variable impedance in the charging circuit for timing capacitor 109 by virtue of the fact that the collector current is a function of the base voltage. The d-c voltage level on a control capacitor 108 connected between the base of transistor 110 and terminal 26 thus determines the rate of charging of capacitor 109 and hence the pulse generator repetition rate. In operation, timing capacitor 109 repetitively charges negatively through transistor 110 and emitter resistor 111, and complementary unijunction 113 breaks over and conducts in each charging cycle when the emitter peak point voltage is reached. Capacitor 109 then discharges through base resistor 112 and generates a firing pulse that is amplified by pulse amplifier circuit 47. The repetition rate of pulse generation depends on the voltage on control capacitor 108, which is a relatively large capacitor (such as 1 microfarad) so that the repetition rate ramps from one setting to another as the cooking temperature or heating level is adjusted or as the protection circuits operate automatically.

Pulse amplifier 47 comprises a p-n-p transistor amplifier 115 connected in series with voltage divider resistors 116 and 117 between terminals 49 and 26, the base of the active device being connected directly to the base 1 of CUJT 113. The junction of resistors 116 and 117 is connected to a transistor amplifier in the Darlington configuration comprising transistors 119 and 122. The collectors of both transistors are coupled directly to positive supply terminal 49, while the emitter of transistor 119 is connected through an emitter resistor 120 to negative terminal 26 and the emitter of transistor 122 is coupled to the gate of thyristor 28. The firing pulse supplied by complementary unijunction 113 is inverted and amplified by transistor 115, and is further amplified by Darlington transistors 119 and 122. Emitter resistor 120 assures a rapid turn-off of transistor 112 when the pulse is completed. Pulse amplifier circuit 47 must supply a sufficient firing pulse to properly turn on the power thyristor, and in the case of a GEC139N silicon controlled rectifier, the pulse must be 1 ampere in 0.1 microsecond or faster to ensure uniform turn-on of the device. The use of high frequency ceramic filter capacitor 126, it will be recalled, provides a low source impedance to supply the required firing pulse.

The operating or output frequency control 41 is basically a variable resistance divider network for adjusting the d-c voltage level on control capacitor 108. This circuit comprises a resistor 42 connected in series circuit relationship with user adjustment potentiometer 40 and another resistor 54 between low voltage supply terminals 49 and 26. The movable pointer of user adjustment potentiometer 40 is connected through a resistor 51 to control capacitor 108, which was previously described as being part of voltage controlled pulse generator 46. Resistor 51 functions to isolate potentiometer 40 from control capacitor 108, and it is useful to the later description to label the junction between these two components, or more particularly the positive plate of capacitor 108, as terminal 108p. Adjustment of potentiometer 40 places a variable amount of resistance in series with control capacitor 108 and is effective to change the voltage on the control capacitor and consequently the inverter output frequency. The value of resistor 52 determines, to a first order, the maximum output frequency that is possible. The value of resistor 54, on the other hand, determines the minimum possible output frequency.

The actual maximum output frequency limit is set by maximum frequency control circuit 42. This circuit includes simply a resistor 56 and a potentiometer 57 connected in series between low voltage supply terminals 49 and 26, and a diode 55 connected between control capacitor terminal 108p and the movable pointer of potentiometer 57. The control operates as a voltage clamp on the voltage across control capacitor 108. Diode 55 is normally reverse biased, but when the potential of terminal 108p rises above a critical voltage as determined by the setting of potentiometer 57, the diode becomes forward biased and conducts. Diode 55 and the portion of potentiometer 57 between its pointer and negative supply terminal 26, normally at ground, is in parallel with control capacitor 108 so that the voltage across the capacitor is limited to 0.6 volts (the forward drop of diode 55) above the value set by potentiometer 57. The effectiveness of this control is limited only by its input impedance.

Thyristor overvoltage detection circuit 45 comprises a string of Zener diodes 81 or other suitable voltage sensitive sensors connected in series with resistors 82–85 between the anode of thyristor 28 and negative terminal 26. For purposes of illustration, only a single Zener diode 81 is shown, but in practice is it expected that a string of devices will be required to obtain the desired voltages rating. Polycrystalline varistors can be substituted in place of the Zener diodes. As is well known, the string of Zener diodes normally does not conduct current but breaks over and conducts when the voltage applied across the string exceeds the sum of their individual breakover voltages. In similar fashion polycrystalline varistors exhibit a voltage regulating characteristic. Zener diodes and polyrcrystallic varistors are commonly known as voltage regulating sensors although they are not used in this mode for this application. The thyristor overvoltage detection circuit 45 also includes a transistor 89 having its base connected to the junction of resistors 84 and 85, its emitter connected directly to negative supply terminal 26, and its collector connected through a resistor 88 to control capacitor terminal 108p. Furthermore, a filter capacitor 80 is connected across resistors 84 and 85, and a protective diode 86 for transistor 89 is connected between the junction of resistors 82 and 83 and low voltage supply terminal 49.

In operation, the application of an overvoltage to an anode of thyristor 28 causes Zener diodes 81 to break over and conduct current, and the resulting voltage drop across resistor 85 turns on transistor 89. Control transistor 89 then tends to discharge capacitor 108 through resistor 88, which lowers the repetition rate of pulse generator 46 and results in changing the anode voltage to a safe level. Resistors 84 and 85 in this circuit set the level of overvoltage detection and provide a positive turn-off bias for transistor 89 when the condition has passed and Zener diodes 81 no longer conduct. Resistor 83 and capacitor 80 comprise a low pass filter which is used to eliminate any capacitive component of rising thyristor anode voltage passed by the Zener string. Until capacitor 80 charges to a predetermined voltage, there is by design insufficient voltage across resistors 84 and 85 to supply the required base drive current for transistor 89. A high frequency transient overvoltage fails to charge capacitor 80 to this level. Diode 86 becomes conductive under appropriate conditions to prevent the application of an over-voltage to transistor 89. The proper choice of discharge resistor 88 in this circuit assures the correct amount of override or takeover of output frequency control 41. A large resistance value prevents effective control because the gain is too low, while a small value can increase the gain to an unstable point.

Figure 6C:
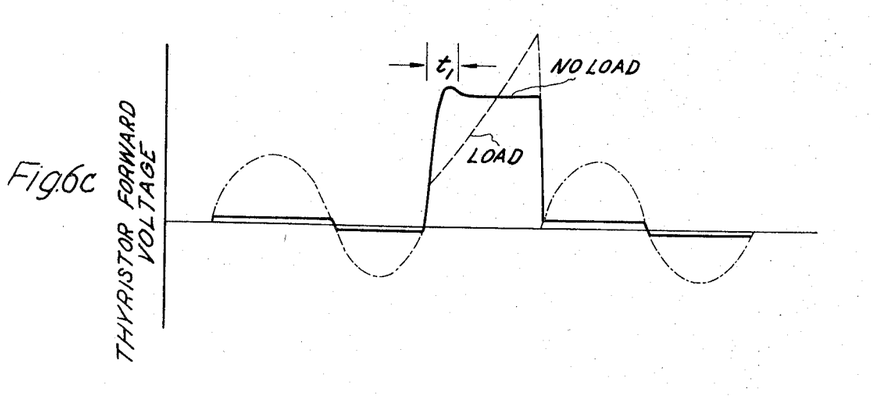
FIG. 6c is a waveform diagram of the forward voltage applied to the thyristor of FIG. 4 under load and no-load conditions, showing for reference purposes the damped sinusoidal induction coil current.

The principle of operation of utensil detection circuit 44 is that with no utensil load coupled to induction heating coil 15, the inverter power circuit (see FIG. 4) is essentially an undamped oscillatory L-C circuit since there is little loss in the high frequency resonant circuit. This means that commutating capacitor 27 (before the additional charge supplied by reset inductor 31) charges negatively as far as it does positively. In the loaded case (see FIG. 6b) the peak negative capacitor voltage at the end of the conduction cycle is considerably less than the peak positive capacitor voltage. Conversely looking at the thyristor forward voltage at the anode of the device as shown in FIG. 6c, the initial reapplied forward voltage for the no-load situation illustrated in full lines during the interval $t_1$ is characteristically higher than for the loaded situation shown in dashed lines. The induction coil current is drawn in dot-dash lines for reference purposes. Utensil presence detection circuit 44 recognizes the initial value only of the reapplied thyristor anode voltage, and is operative in response to the sensing of a predetermined voltage level indicative of the absence of a coupled utensil to reduce the inverter output frequency to a safe, low frequency. A portion of this circuit is identical or similar to the thyristor overvoltage detection circuit 45 just described. These are Zener diode string 71 (only one is illustrated), resistors 72–75, low pass filter capacitor 70, and resistor 78 and transistor 79. A variable resistor 77 is additionally connected in series with resistor 78 and the collector-emitter path of transistor 79 between terminals 108p and 26. A predetermined relatively high voltage, less than needed to actuate Zener diode string 81, causes Zener diode string 71 to break over and conduct, as a result of which transistor 79 turns on and tends to discharge control capacitor 108. A monostable multivibrator arrangement is used whereby transistor 79 and the other discharge circuit components are enabled and can become conductive only during the relatively short time interval $t_1$ (such as 4 microseconds) after the appearance of an initial high thyristor anode voltage.

The monostable timing circuit includes a first p-n-p transistor 63 connected in series with a collector resistor 64 between terminals 49 and 26, and a second n-p-n transistor 68 having its emitter connected to terminal 26, its collector connected to the base of transistor 79, and its own base connected through resistors 66 and 67 to low voltage supply terminal 49. The collector of transistor 63 is coupled by means of capacitor 65 to the base of transistor 68. The biasing circuit for transistor 63 is provided by resistor 62. Resistors 58 and 59 are connected in series between the anode of thyristor 28 and negative terminal 26, and a capacitor 60 is connected to the junction of these two resistors and to the base of transistor 63. Normally transistor 63 is biased to the conducting condition by the circuit completed through resistor 62 to negative terminal 26, and in similar manner transistor 68 is biased to the conducting condition by resistors 66 and 67. Capacitor 65 therefore is charged to approximately 15 volts. A diode 61, connected to the base of transistor 63 and in series with resistor 62 between terminals 49 and 26, protects transistor 63 from excessive reverse voltage. When the thyristor anode voltage goes positive in each cycle due to the reapplied forward voltage, a reverse bias is to the base of transistor 63 through resistor 58 and capacitor 60, and turns off. Capacitor 65 is still charged, however, and due to the fact that the positive plate is now coupled to negative terminal 26 through resistor 64, the base of transistor 68 is driven sharply negative, thereby reverse biasing transistor 68 and turning it off. During the ensuing interval while capacitor 65 discharges and before transitor 68 turns back on, the overvoltage detection circuit comprising components 70–79 is free to operate. As soon as transistor 68 turns off, capacitor 65 discharges through resistors 64, 66, and 67, and at the end of the interval $t_1$ transistor 68 is no longer reverse biased and again turns on.

By way of brief summary of the operation of the utensil presence detection circuit 44, a relatively high thyristor anode voltage is detected during the invertal $t_1$ of each complete cycle by the circuit comprising components 69–79. The Zener diodes 71 normally do not conduct, but supply current to series resistors 72–75 when their combined breakdown voltage is exceeded. Capacitors 69 and 70 prevent actuation of this portion of the circuit by high frequency transient components of the anode voltage. Transistor 79 is forward biased by the voltage appearing across resistor 75, thereby tending to discharge control capacitor 108 in each cycle through the series discharge circuit comprising resistors 77 and 78 and transistor 79. This arrangement overrides output frequency control 41 and reduces the inverter output frequency to the audio frequency range where it can be heard by the user. The circuit comprising components 58–68 is essentially a monostable multivibrator that allows transistor 79 to turn on in response to a sensed high anode voltage only during the short time interval $t_1$ following the reapplication of positive thyristor anode voltage. Transistors 63 and 68 are normally conductive and since the collector of transistor 68 is connected directly to the base of transistor 79, this means that transistor 79 is clamped off. The appearance of positive anode voltage in each cycle reverse biases transistor 63 through resistors 58 and capacitor 60, as a result of which charged capacitor 65 also applies a reverse bias voltage to transistor 68, turning it off. Transistor 68 remains nonconducting only during the interval when capacitor 65 is discharging through resistors 64, 66, and 67, and again turns on after this short interval $t_1$ to clamp the base of transistor 69 so that it is either turned off or cannot conduct. In actual practice the placing of a utensil on support 16 and its removal takes a relatively long time as compared to the period of ultrasonic frequency cycle. Therefore the repetition rate of firing pulse generation ramps slowly from the ultrasonic range to the audio range or vice versa.

An alternative procedure in the event the audible annunciation is not desired is to simply reduce the output frequency to the lower limit (18 kHz). Still another technique is to inhibit the inverter completely and test periodically for a coupled utensil so long as switch 21 is closed.

Low input voltage detection circuit 43 monitors the voltage on power circuit positive d-c supply terminal 25 and prevents thyristor 28 from being fired while there is insufficient commutating energy in commutation capacitor 27 to ensure proper circuit operation. This circuit reduces the firing pulse repetition rate and therefore the inverter output frequency to a low value and then inhibits further firing pulses until adequate d-c voltage is returned. Upon initially turning on the unit, the circuit starts the power circuit with a safe, low operating frequency which is increased in a safe controlled manner to prevent low commutation time conditions from occurring. A low input d-c voltage level below a predetermined voltage is sensed by a Zener diode 90 or other voltage sensitive or voltage responsive sensor. Under normal conditions Zener diode 90 is conductive and supplies current to the remainder of the detection circuit, and it is the absence of this current that triggers the operation of the circuit. Zener diode 90 is connected in series with a pair of resistors 91 and 92 between high voltage d-c supply terminals 25 and 26. The junction of these two resistors is connected through a resistor 93 to the base of a normally non-conducting p-n-p transistor 97. The emitter of transistor 97 is connected directly to supply terminal 49, while the collector is connected through resistor 98 to the base of a second normally non-conducting n-p-n transistor 95. To establish a feedback path between transistors 97 and 95, the collector of transistor 95 is coupled through a resistor 94 to the junction of resistors 91 and 92. An override or takeover circuit shunting control capacitor 108 comprises a diode 95a and adjustable resistor 95b connected in series between terminal 108p and the collector of transistor 95. The voltage in the override circuit is clamped at a predetermined level by a Zener diode 96 connected between the emitter of transistor 95 and supply terminal 26.

Transistor 97 is normally biased non-conducting by the current flow through Zener diode 90 which establishes a reverse biasing potential at the base of transistor 97, as a result of which there is no base drive for transistor 95 which is also non-conducting. Upon the sensing of a low input power circuit d-c voltage, Zener diode 90 now ceases to conduct and base drive current for transistor 97 is established by the connection of the base to negative supply terminal 26 through resistors 93 and 92. Transistor 95 also turns on in snap action fashion by means of the feedback connection established by resistors 98 and 94. The voltage across control capacitor 108 is now clamped by conducting diode 95a and transistor 95 to the voltage of Zener diode 96. This voltage level sets the basic inverter output frequency to the lower frequency limit, typically 18–20 kHz. At this frequency, it would be safe to start gating thyristor 28 at any voltage above the lower limits set by Zener diode 90.

A low voltage condition in the power circuit not only requires a low firing pulse repetition rate, but that the firing of thyristor 28 be halted completely. This is accomplished by clamping the voltage across main timing capacitor 109 in the voltage controlled pulse generator 46, but this can occur only when transistors 97 and 95 are conducting. To this end, the collector of transistor 97 is also connected to a resistor 100 which is in series with Zener diode 102 and a resistor 103. A timing delay capacitor 99 and a capacitor discharge resistor 101 are both in parallel with the series connected Zener diode 102 and resistor 103, and the junction of these last two components is connected to the base of an n-p-n transistor 106. The collector-emitter of transistor 106 is connected in series with a pair of voltage divider resistors 105 and 104 between terminals 49 and 26, and the junction of resistors 104 and 105 is connected to the base of a p-n-p clamping transistor 107. The emitter and collector of clamping transistor 107 are connected directly to the terminals of main timing capacitor 109. With this arrangement, it is seen that the turning on of transistor 106 supplies base drive current to transistor 107, which also turns on to clamp the complementary unijunction pulse generator.

The change of stage of transistor 97 from non-conducting to conducting when a low input voltage is sensed also initiates current flow through the low pass filter comprising resistor 100 and time delay capacitor 99, which charges at a rate dependent upon the time constant if these two components. After a predetermined time delay, capacitor 99 has charged to a voltage level sufficient to cause Zener diode 102 to break over and conduct. Accordingly, after this time delay base drive current is supplied to transistor 106, which turns on and sequentially results rendering conductive clamping transistor 107. The entire sequence of events, then, is that transistors 97 and 95 initially become conductive and clamp the voltage across control capacitor 108 to the level determined by Zener diode 96, which sets the pulse generator firing repetition rate to its lower frequency limit. After a time delay determined by the time constant of resistor 100 and capacitor 99, transistors 106 and 107 also turn on to completely inhibit the generation of firing pulses. Upon the return of sufficient input d-c voltage to enable safe operation of the power circuit, Zener diode 90 conducts causing transistors 97 and 95 to turn off initially, as well as transistors 106 and 107 upon the discharge of capacitor 99 through discharge resistor 101. Control circuit 33 then starts generating firing pulses at a safe minimum repetition rate and increases the repetition rate to obtain the desired inverter output frequency at a rate determined by the time constant of control capacitor 108 and the control impedance of output frequency control circuit 41.

Low input voltage detection circuit 43 also operates during shut-down of the induction surface unit when switch 21 (FIG. 4) is turned off to remove power from the unit. The main power supply filter capacitor 24 (FIG. 4) of course requires a few 60 Hz cycles to discharge. As soon as the input voltage sensed by Zener diode 90 drops to a low enough value, transistors 97 and 95 turn on to clamp control capacitor 108 to a voltage resulting in a low repetition rate. At the end of the time delay, clamping transistor conducts and inhibits further generation of firing pulses. This controlled de-energization of the power circuit controls the transients in the system including those caused by the interaction of the series resonant circuit with the parallel resonant circuit formed by capacitor 27 and reset inductor 31, which could cause a commutation failure.

By way of example of a specific induction surface unit suitable for use in an electric range with 120 volt service, the required maximum power output is 1500 watts. The peak input d-c voltage to the power circuit is 150 volts, and signal level control circuit 33 is supplied with 15 volts d-c. The ultrasonic frequency range of interest is about 18 kHz. The combined equivalent coil inductance 15$i$ and utensil inductance 17$i$ (FIG. 5) is typically 150 microhenries, and the combined equivalent coil resistance 15$r$ and utensil resistance 17$r$ is typically 15 ohms. Reset inductor 31 is, of course, relatively large. Using a power thyristor 28 with a peak forward voltage of 800 volts, Zener diode 81 detect an overvoltage at the anode of the thyristor of 750 volts or possibly less. Zener diodes 71 in utensil presence detection circuit 44 detect an initial reapplied forward voltage at the thyristor anode of about 400 volts. The critical low input voltage that actuates low input voltage detection circuit 43 is typically 90 volts. For a countertop warming or cooking appliance a lower maximum power output is satisfactory, such as 200–400 watts.

The multi-purpose control circuit 33 can be used with a variety of inverter configurations employing other power semiconductors such as the diac and triac. With the possible exception of the utensil presence detection circuit, the remainder of the control circuit is suitable for usage with inverters in general for applications other than in cooking appliances. Other one-thyristor, two-thyristor, one-transistor, and two-transistor inverters especially appropriate for ultrasonic frequency induction cooking appliances are described in the aforementioned application Ser. No. 200,424, and also in allowed application Ser. No. 200,526 by David L. Bowers, Donald S. Heidtmann, and and John D. Harnden, Jr., filed Nov. 19, 1971, and assigned to the same assignee as this invention. A similar approach is used to determine the exact functions and configurations of the protection circuits. Some of these inverters require two firing or base drive circuits, so that two of the control circuits 33 may be required, one for each device, although it may not be necessary to include all of the protective features in each control circuit.

While the invention has been particularly shown and described with reference to a preferred embodiment thereof, it will be understood by those skilled in the art that the foregoing and other changes in form and de-

What I claim as new and desire to secure by Letters Patent of the United States is:

1. A reliable static power conversion circuit including
an inverter power circuit controlled by solid state power device means for converting a unidirectional input voltage to an alternating output wave, and
a solid state control circuit energized for signal level operation, said control circuit comprising a turn-on circuit for selecting the intervals of conduction of said solid state power device means, and further comprising protection circuit means for detecting predetermined abnormal power circuit conditions and modifying the operation of said control circuit to obtain reliable and automatic operation of the static power conversion circuit,
said protection circuit means being actuated by sensor means connected between selected points on said inverter power circuit and said control circuit, wherein
said protection circuit means comprises low input voltage detection circuit means for monitoring the input voltage to said inverter circuit and modifying the operation of said turn-on circuit in response to the sensing of a low input voltage, and
said sensor means is a voltage responsive sensor connected between a unidirectional input voltage terminal and said control circuit.

2. A reliable static power conversion circuit including
an inverter power circuit controlled by solid state power device means for converting a unidirectional input voltage to an alternating output wave, and
a solid state control circuit energized for signal level operation, said control circuit comprising a turn-on circuit for selecting the intervals of conduction of said solid state power device means, and further comprising protection circuit means for detecting predetermined abnormal power circuit to obtain reliable and automatic operation of the static power conversion circuit,
said protection circuit means being actuated by sensor means connected between selected points on said inverter power circuit and said control circuit, wherein
said turn-on circuit is a variable repetition rate circuit supplying turn-on signals to said solid state power device means at a variable rate to thereby adjust the frequency of said alternating output wave, and said protection circuit means further includes a maximum frequency control circuit for limiting the repetition rate of said turn-on circuit to a predetermined maximum.

3. A circuit according to claim 2 wherein said inverter circuit is a series resonant inverter circuit, and said protection circuit means for detecting abnormal power circuit conditions comprises
overvoltage detection circuit means for monitoring the voltage at one terminal of said solid state power device means that is operative to change the repetition rate of said turn-on circuit in response to the sensing of an overvoltage, and
low input voltage detection means for monitoring the input voltage to said inverter circuit that is operative to change the repetition rate of said turn-on circuit in response to the sensing of a low input voltage,
said sensor means being voltage responsive sensors.

4. A circuit according to claim 3 wherein said low input voltage detection circuit means includes inhibit circuit means for inhibiting said turn-on circuit and reducing the repetition rate to zero after a predetermined time delay following the sensing of a low input voltage.

5. A circuit according to claim 4 wherein said static power conversion circuit further includes a full wave rectifier having a filter capacitor connected across its terminals, and
said low input voltage detection circuit means is operative during start-up and shut-down of said static power conversion circuit when power is supplied to and removed from said circuit.

6. A reliable static power conversion circuit including
an inverter power circuit controlled by solid state power device means for converting a unidirectional input voltage to an alternating output wave,
a solid state control circuit energized for signal level operation, said control circuit comprising a turn-on circuit for selecting the intervals of conduction of said solid state power device means, and further comprising protection circuit means for detecting predetermined abnormal power circuit conditions and modifying the operation of said control circuit to obtain reliable and automatic operation of the static power conversion circuit,
said protection circuit means including a low input voltage detection circuit for monitoring the input voltage of said inverter circuit and modifying the operation of said control circuit in response to the sensing of a low input voltage, and an overvoltage detection circuit for monitoring the voltage at a terminal of said power device means and modifying the operation of said control circuit in response to the sensing of an overvoltage, and
voltage responsive sensors respectively connected between a unidirectional input voltage terminal and said low input voltage detection circuit, and between said power device means terminal and said overvoltage detection circuit, for actuating said protection circuit means.

7. A circuit according to claim 6 wherein said voltage responsive sensors comprise Zener diodes that are respectively nonconductive to actuate said low input voltage detection circuit and conductive to actuate said overvoltage detection circuit.

8. A circuit according to claim 6 wherein said low input voltage detection circuit includes an inhibit circuit for inhibiting operation of said turn-on circuit after a predetermined time delay following the sensing of a low input voltage.

9. A circuit according to claim 8 wherein said static power conversion circuit further includes a full wave rectifier having a filter connected across its terminals including a filter capacitor, and
said low input voltage detection circuit is operative during start-up and shut-down of said static power conversion circuit when power is supplied to and removed therefrom.

* * * * *